SOUND RECORDING AND REPRODUCING APPARATUS

Original Filed April 8, 1954

INVENTOR.
BARTON A. PROCTOR
BY
Nolte and Nolte
ATTORNEYS

INVENTOR.
BARTON A. PROCTOR
BY
Nolte and Nolte
ATTORNEYS

INVENTOR.
BARTON A. PROCTOR
BY
Nolte and Nolte
ATTORNEYS

INVENTOR.
BARTON A. PROCTOR
BY
Nolte and Nolte
ATTORNEYS

INVENTOR.
BARTON A. PROCTOR
BY
Nolte and Nolte
ATTORNEYS

INVENTOR.
BARTON A. PROCTOR
BY
Nolte and Nolte
ATTORNEYS

Oct. 18, 1966 B. A. PROCTOR 3,279,799

SOUND RECORDING AND REPRODUCING APPARATUS

Original Filed April 8, 1954

9 Sheets-Sheet 7

INVENTOR.
BARTON A. PROCTOR
BY
Nolte and Nolte
ATTORNEYS

Oct. 18, 1966 B. A. PROCTOR 3,279,799

SOUND RECORDING AND REPRODUCING APPARATUS

Original Filed April 8, 1954 9 Sheets-Sheet 8

INVENTOR.
BARTON A. PROCTOR
BY
Nolte and Nolte
ATTORNEYS

SOUND RECORDING AND REPRODUCING APPARATUS

Original Filed April 8, 1954

9 Sheets-Sheet 9

INVENTOR
BARTON A. PROCTOR
BY
Nolte and Nolte
ATTORNEYS

United States Patent Office 3,279,799

Patented Oct. 18, 1966

3,279,799

SOUND RECORDING AND REPRODUCING APPARATUS

Barton A. Proctor, Larchmont, N.Y., assignor, by direct and mesne assignments, to Proctor Dictating Machine Corporation, New York, N.Y., a corporation of New York Continuation of abandoned application Ser. No. 720,763, Mar. 11, 1958, which is a division of application Ser. No. 421,839, Apr. 8, 1954, now Patent No. 2,911,161, dated Nov. 3, 1959. This application Nov. 3, 1961, Ser. No. 149,966

6 Claims. (Cl. 274—11)

This application is a continuation of my co-pending application Serial No. 720,763 filed March 11, 1958, now abandoned, which was in turn a division of my application Serial No. 421,839, filed April 8, 1954, now Patent No. 2,911,161, for Sound Recording and Reproducing Apparatus, which patent was in turn a continuation-in-part of my prior application, Serial No. 338,777, filed February 25, 1953, now Patent No. 2,933,319.

The present invention relates to sound recording and reproducing apparatus, and more particularly to remote control means for apparatus of this character.

Among the objects of the invention is the provision of remote control means for use with sound recording and reproducing apparatus as shown and described in said application Serial No. 338,777.

A further object of the invention is the provision of certain modifications and improvements with respect to the sound recording and reproducing apparatus of the said application Serial No. 338,777.

Another object of the invention is the provision of remote indicating means for indicating the remaining available recording time on each of plurality of recording channels.

A further object of the invention is the provision of remote indicating means for showing which of several recording channels is in actual use.

Still another object of the invention is the provision of a recording and reproducing device of this character comprising a main portion and a removable magazine portion with electrical connections extending between the two portions, an electrical connector being provided through which the electrical connections extend, the electrical connector being arranged to secure the magazine portion to the main portion.

A further object of the invention is the provision of means for securing the reels upon which the recording medium is wound to their respective shafts.

A further object of the invention is the provision of adjustable means for causing the driven reel to operate at normal speed as it becomes nearly completely unwound.

Still another object of the invention is the provision of limit switch means for stopping the further driving of the recording medium when use of the ultimate recording area has been completed.

Other and further objects and advantages of the invention will become apparent upon reading the following specification together with the accompanying drawing forming a part therof.

Throughout the specification and drawing, reference numerals 600 and higher designate elements not shown in application Serial No. 338,777, referred to above. Reference numerals less than 600 designate elements which are more fully shown and described in my said application Serial No. 338,777.

Referring to the drawing.

Figures 1, 2:
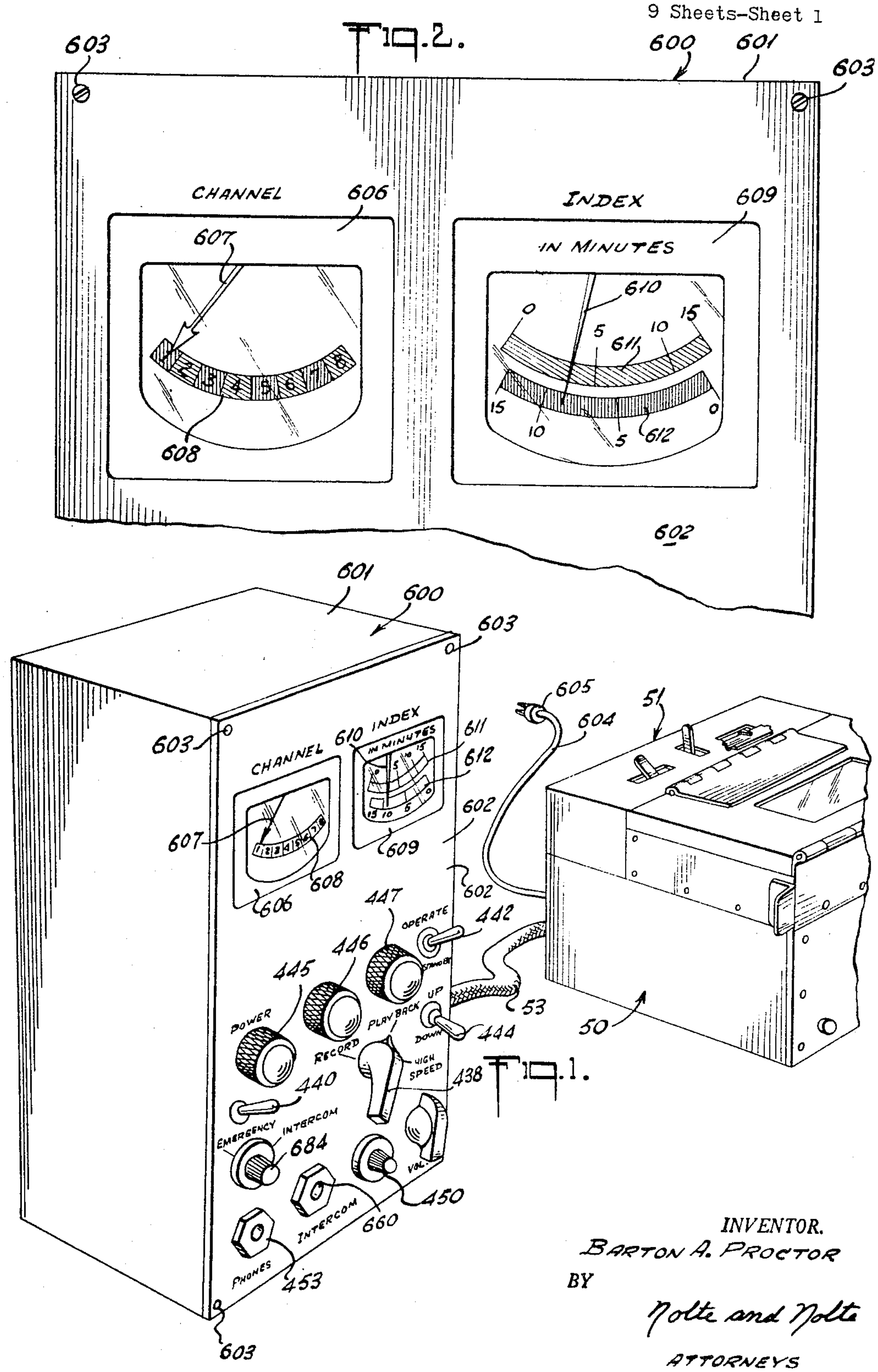
FIGURE 1 is a perspective view of a remote control unit together with a fragmentary perspective view of sound recording and reproducing apparatus connected thereto for control thereby.
FIGURE 2 is an enlarged fragmentary view in elevation of a portion of the control panel of the remote control unit showing the dials of certain indicating instruments.

Referring to FIG. 1 a remote control unit, designated generally as 600 comprises a cabinet or housing 601 with a front panel 602 removably secured thereto by screws 603. The remote control unit 600 is shown connected to a recording device designated generally as 50 by a flexible multi-conductor cable 53. A flexible power supply cord 604 provided with an attachment plug cap 605 is connected to the recording device 50 and may be conveniently connected by a suitable power supply receptacle (not shown) by insertion of the attachment plug cap 605 therein for the energization of the recording device 50 and the remote control unit 600 connected thereto.

Mounted on front panel 602 is a recording channel indicator 606 provided with a pointer 607 and an arcuate scale 608 subdivided into either contiguously arranged areas consecutively numbered from 1 to 8, the odd numbered areas being of one color and the even numbered areas being of another color so that they may be readily distinguished from the odd numbered areas. The channel indicator 606 may be an electrical indicating instrument of conventional type such as a milliammeter provided with the special scale 608.

Mounted on front panel 602 adjacent to the channel indicator 606 is a time indicator 609 provided with a pointer 610. Disposed in indicating relationship with respect to pointer 610 are an upper time scale 611 and a lower time scale 612, the scales 611 and 612 being calibrated in minutes from zero to 15 in opposite directions. The lower time scale 612 is distinctively colored to match the color of the odd numbered areas of channel indicating scale 608 and the upper time scale 611 is colored to match the color of the even numbered areas of channel indicating scale 608. When the pointer 607 of the channel indicator 606 is on any particular area, the correspondingly colored scale of time indicator 609 is used. The calibration of time indicator 609 may be either in elapsed recording time or in remaining unused recording time, as desired.

Also, mounted on panel 602 is a socket 445 for a pilot light 508 (FIG. 18) which indicates when the power is turned on; a socket 446 for a pilot light 509 (FIG. 18) which indicates when the device is recording; and a socket 447 for a pilot light 510 which indicates when the device is conditioned for playback. The operating handle 442 of a tape control switch 506 is adjacent to socket 447.

The operating handle 440 of main power switch 502 is disposed below socket 445. An operating handle 438 for a multi-pole three position switch 503 is located below lamp sockets 446 and 447. The operating handle 444 of a recording head carriage raising and lowering switch 507 is located to the right of switch handle 438. A jack 453 for the connection of headphones is located near the bottom of panel 602. An additional jack 660 is provided for connection to an inter-communicating system or other system from which it is desired to receive and record messages or other material. A fuse holder 450 is provided for a main power fuse 501.

Figures 3, 4:
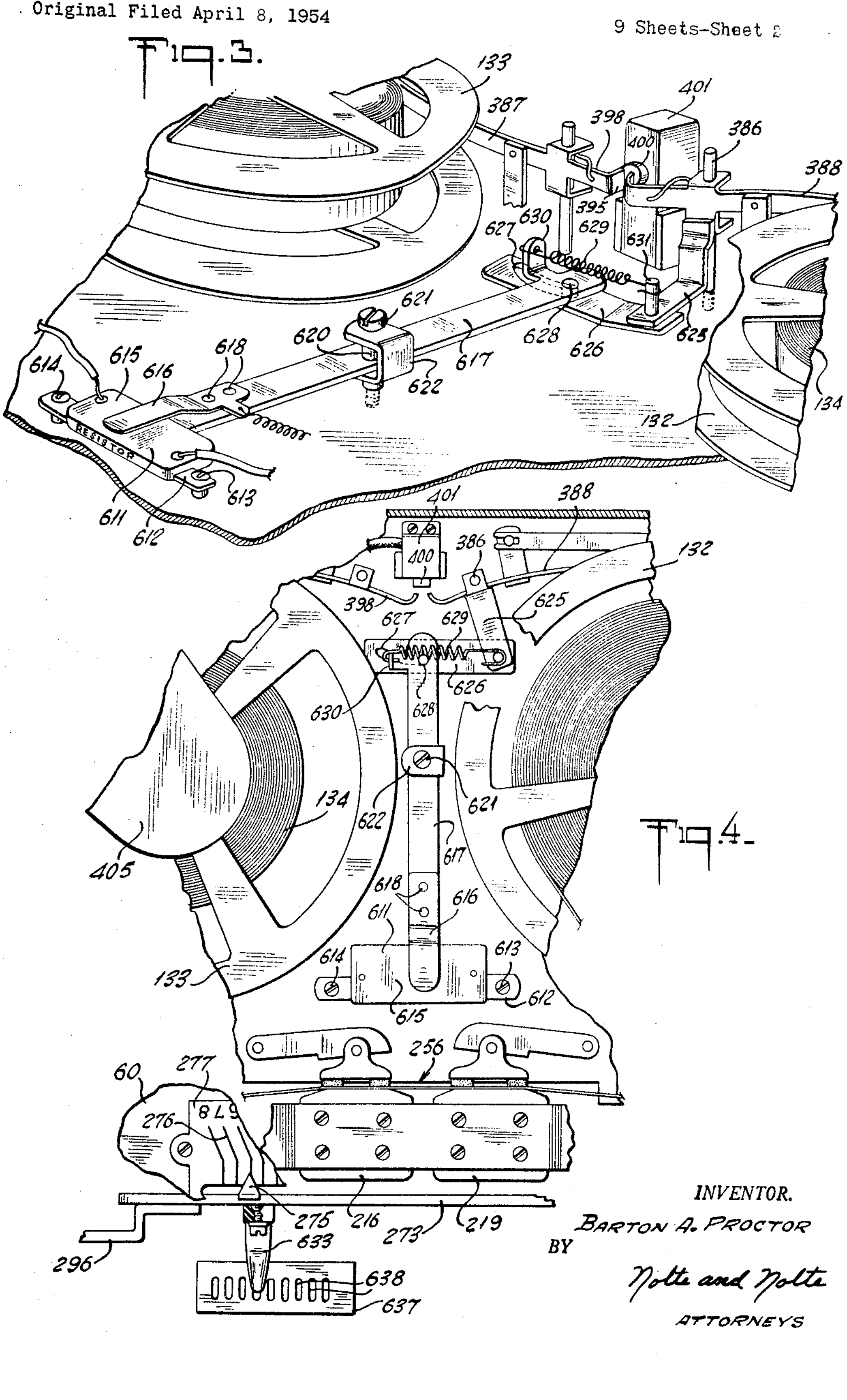
FIGURE 3 is an enlarged fragmentary prespective view showing means for deriving an electrical indication which varies in accordance with the longitudinal position of the recording medium with respect to the reels between which it is selectively wound and unwound.
FIGURE 4 is a plan view of the electrical indicating deriving means shown in FIG. 3.

Referring to FIGS. 3 and 4, a resistor 611 is arranged on a suitable mounting strip 612. The mounting strip 612 is secured to main apparatus mounting plate 104 by screws 613 and 614. The resistance wire or other resistive material 615 at the upper surface of resistor 611 is exposed and is resiliently engaged by a movable contact finger 616 secured to a movable arm 617 by rivets 618, and insulated from arm 617 by conventional means including insulating spacers 619 on opposite sides of arm 617. The movable arm 617 is pivoted intermediate its ends on the smooth shank portion 620 of a pivot screw 621. A U-shaped spacer bracket 622 straddles the movable arm 617 and is secured to main apparatus mounting plate 104 by pivot screw 620.

Switch actuating arm 388 which is pivoted on upright post 386 carries an additional bracket 625 for causing movement of arm 617. Fixed to the free end of bracket 625 is a plate 626 which has an elongated slot 627 formed therein. A pin 628 carried by arm 617 near one end thereof projects downwardly into slot 627 and is freely slidable therein.

A helical tension spring 629 extends between an upturned ear 630 formed on one end of arm 617 and an upright pin 631 mounted on bracket 625. Tension spring 629 pulls ear 630 to the right as viewed in FIG. 3 so that pin 628 normally bears against the right hand end of slot 627. The tension of spring 629 is sufficient to cause arm 617 to follow the movements of bracket 625 and switch actuating arm 388 moving contact finger 616 over the upper surface 615 of resistor 611 in accordance with the position of switch actuating arm 388.

As described in my copending application Serial No. 338,777 filed February 25, 1953, the switch actuating arms 387 and 388 bear yieldingly against the recording medium 134 wound on the reels 132 and 133 and are so adjusted that whenever either reel 132 or 133 is nearly empty, one of the free ends 398 or 399, respectively, will press on the actuating button 400 of switch 401. Pressure on actuating button 400 causes the reels 132 and 133, if operating at high speed, to drop to normal speed so that reversal of the direction of travel of recording medium 134 will always take place at normal speed. The present invention, by the provision of bracket 625 on switch actuating arm 388 and arm 617 which follows the movements of bracket 625, causes the position of contact finger 616 on resistor 611 to be determined by the amount of recording medium 134 which is wound on reel 132.

When the pivoted arm 405 (FIG. 10) is raised and rotated to replace reel 132, mechanism more fully described in my said copending application causes switch actuating arm 388 to move outwardly to clear the flanges of reel 132. When this occurs, arm 625 moves to the right as viewed in FIG. 3, beyond its normal limit of travel. Tension spring 629 then yields and plate 626 moves with slot 627 in sliding engagement with downwardly extending pin 628 after the normal limit of travel of arm 617 has been reached. The length of slot 627 is sufficient to permit outward movement of switch actuating arm 388 to clear the flanges of reel 132, which movement is required in order to permit reel 132 to be removed and replaced without interference by switch actuating arm 388. Normally, with pivoted arm 405 in the position shown in FIG. 10, the downwardly projecting pin 628 will be held in engagement with the right hand end of slot 627 by tension spring 629 and will follow the movements of bracket 625 while in this position.

Figures 5, 6, 7:
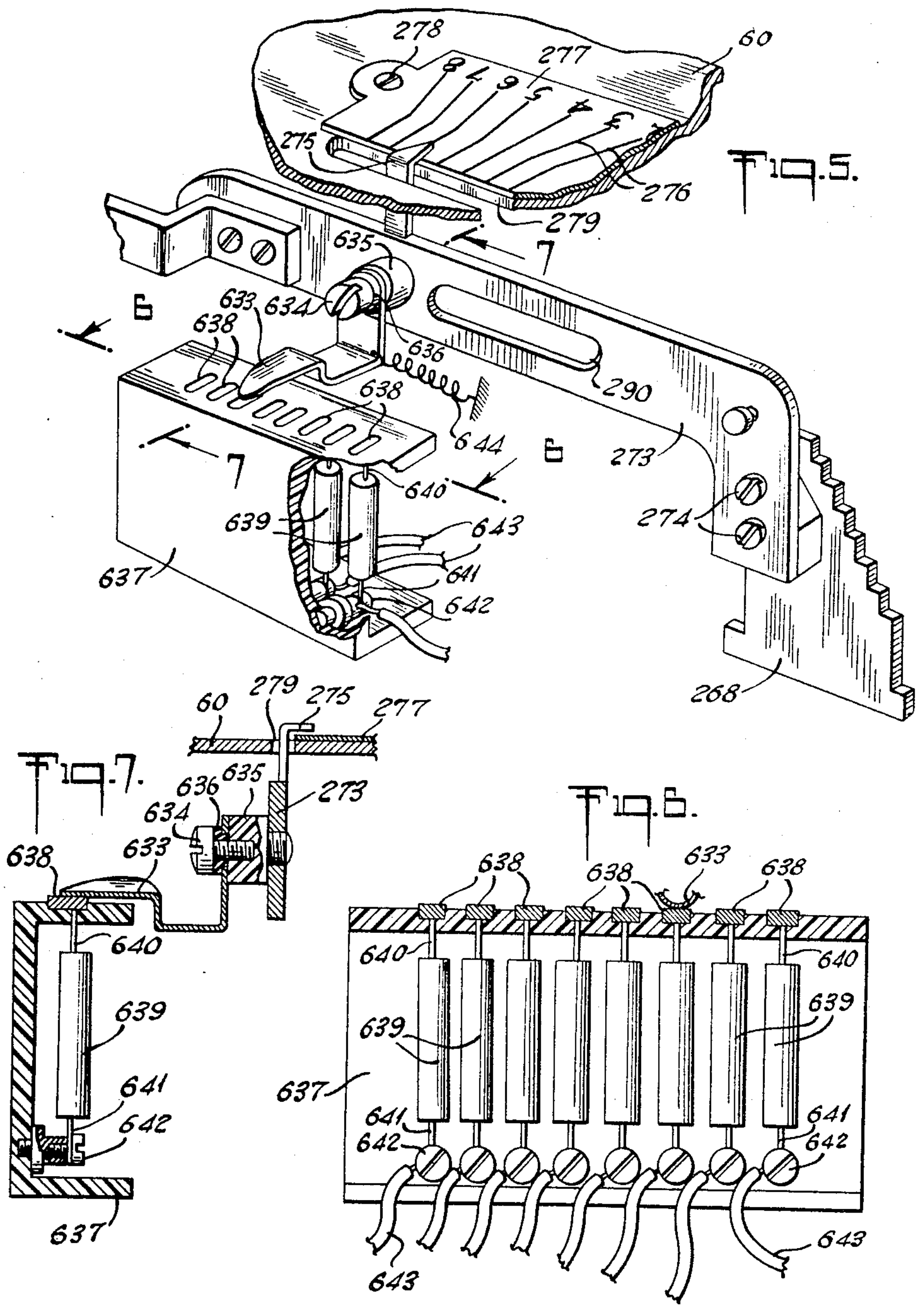
FIGURE 5 is a fragmentary prespective view, partly broken away, of means for deriving an electrical indication which varies in accordance with the vertical position of the recording head carriage.
FIGURE 6 is a sectional view in elevation taken along the line 6—6 of FIG. 5, looking in the direction of the arrows.
FIGURE 7 is a sectional view in elevation taken along the line 7—7 of FIG. 5, looking in the direction of the arrows.

Referring to FIGS. 5, 6 and 7, there is shown a selective switch and a group of resistors for controlling the channel indicator 606. The vertical position of the recording head carriage 256 (FIG. 15) which moves along upright guide posts 257 and 258 is controlled by a pair of step members 267 and 268 which are held in fixed spaced relationship by a carriage control bar 273, being secured thereto by screws 274. The step members 267 and 268 move horizontally on supporting rollers 269 mounted in brackets 270 secured to main apparatus mounting plate 104. A guide member (not shown) engages elongated slot 290 formed in carriage control bar 273.

Figure 15:
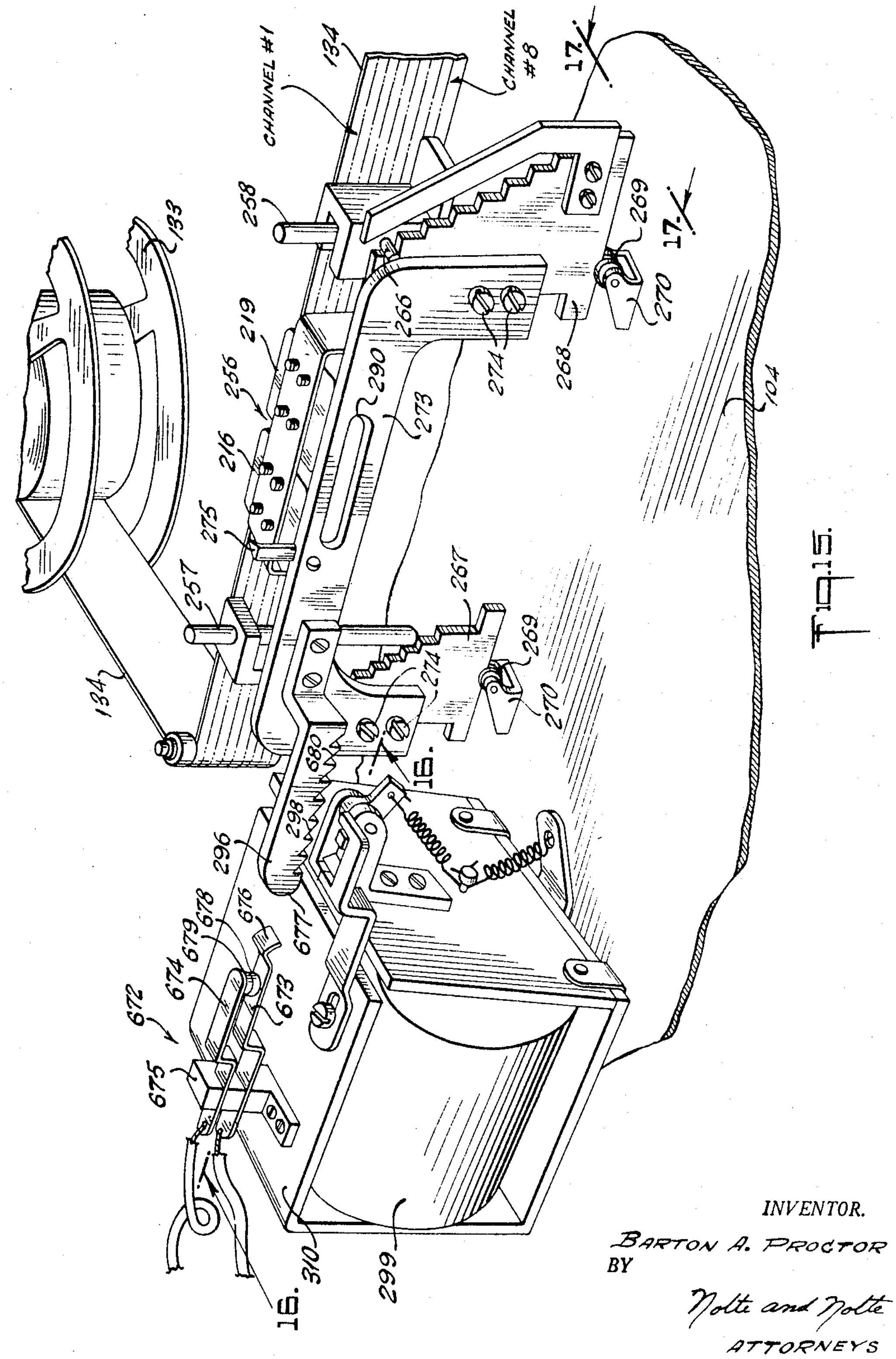
FIGURE 15 is a fragmentary perspective view of the recording head carriage lowering mechanism showing a limit switch for deenergizing the recording device after the lowermost recording area of the recording medium has been used.

The recording head carriage 256 is provided with a pair of pins, of which one pin 266 may be seen in FIG. 15. These pins rest on the steps of the step members 267 and 268 so that the horizontal position of carriage control bar 273 changes in accordance with the vertical position of recording head carriage 256. In the embodiment illustrated, there are eight vertically spaced recording channels on recording medium 134, and eight corresponding steps on the step members 267 and 268. The recording heads 216 and 219 are vertically positioned by recording head carriage 256 for operation along any one of the eight recording channels of recording medium 134. A direct indication of the particular channel which is in use is given by an indicator pointer 275 (FIG. 5) fixed to carriage control bar 273 which cooperates with a fixed scale 276 marked on an index plate 277 secured to the upper cover 60 of the recording device 50 by screws 278. Indicator pointer 275 extends through a slot 279 formed in upper cover 60.

For remote indication of the particular channel which is in use, a resilient contact finger 633 is fixed to carriage control bar 273 for horizontal movement therewith by a mounting screw 634. Contact finger 633 is insulated from carriage control bar 273 and mounting screw 634 by an insulating bushing 635 and an insulating washer 636.

A resistor box 637 formed of suitable insulating material is disposed below contact finger 633. Arranged on the upper surface of resistor box 637 in a row parallel to the direction of movement of carriage control bar 273 are eight contact segments 638 whose spacing corresponds to the horizontal spacing between the steps of step members 267 and 268. A separate and distinct one of the eight contact segments 638 is engaged by contact finger 633 in each of its eight positions, and each contact segment thus engaged corresponds to one of the eight recording channels on recording medium 134.

Eight resistors 639, each of a different resistance value, are disposed within the resistor box 637.

The upper lead 640 of each of these resistors 639 is connected to one of the contact segments 638. The lower lead 641 of each resistor is connected to an individual screw type terminal 642. An individual lead wire 643 is connected to each of the eight terminals 642. A flexible lead wire 644 is connected to contact finger 633. For each of the eight positions of carriage control bar 273, a circuit will be completed from flexible lead 644 and contact finger 633 through one of the eight contact segments 638 and the particular resistor 639 connected thereto to one of the eight lead wires 643. The resistance value of the particular resistor 639 will determine the resistance value of the circuit thus completed.

Figure 8:
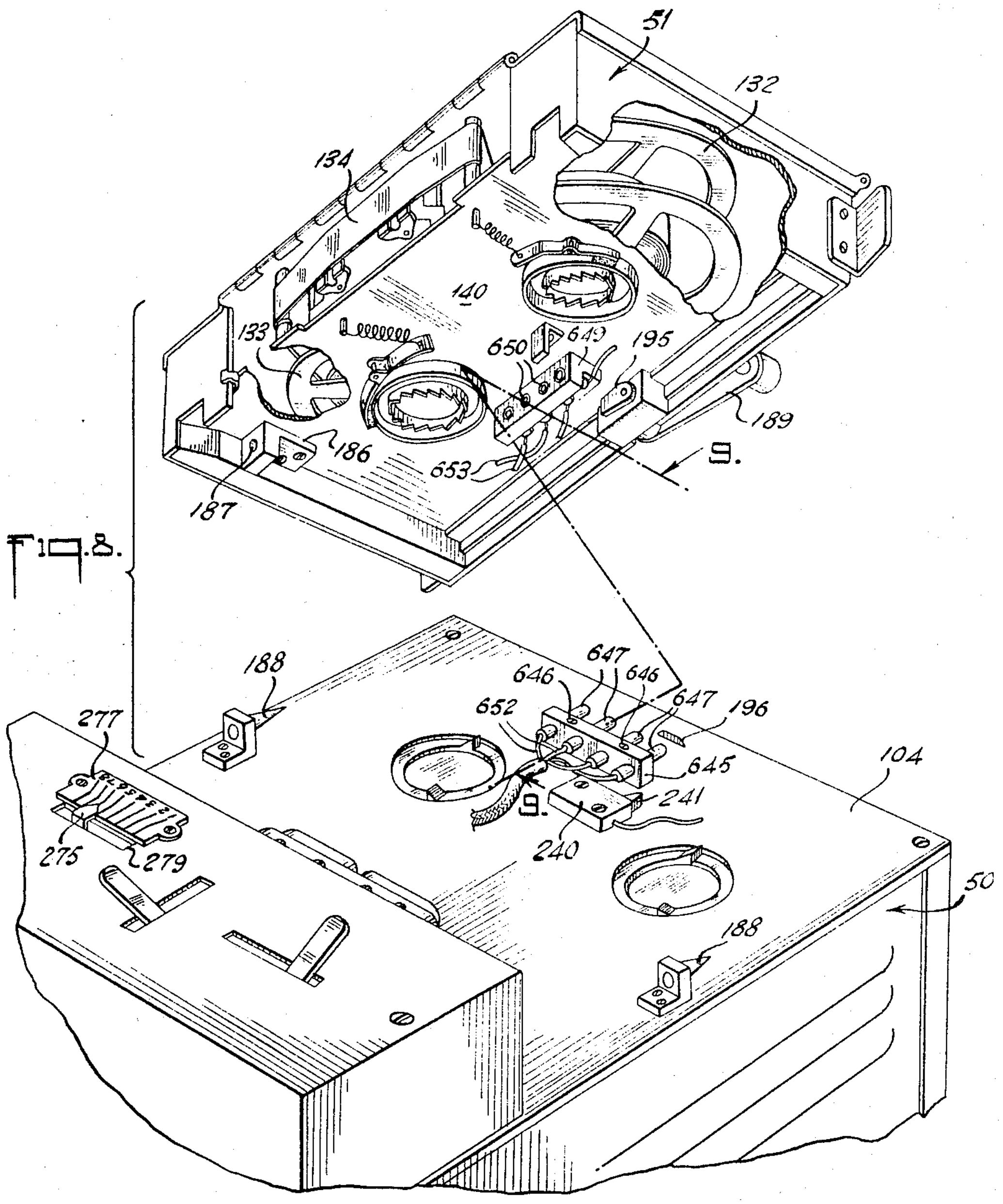
FIGURE 8 is an exploded perspective view of the recording device and magazine, the magazine being viewed from its under side and partly broken away.
Figure 9:
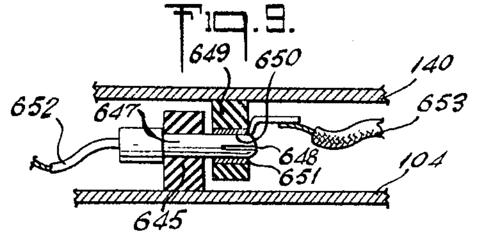
FIGURE 9 is an enlarged sectional view taken along the line 9—9 of FIG. 8 showing plug and jack connections in engaged relationship.

Referring to FIGS. 8 and 9, detachable coupling means are provided for connecting a plurality of conductors which extend between the removable magazine 51 and the recording and reproducing device. This detachable coupling device also serves to lock the magazine 51 in operating position on the recording and reproducing device 50 with the aid of locking handle 189 and the locking tongue 195 which is rotated thereby to engage slot 196 and also with the aid of the conical projecting members 188 which enter the conical recesses 187 in the blocks 186 fixed to the magazine 51.

A block of insulating material 645 (FIGS. 8 and 9) is secured to the upper surface of main apparatus mounting plate 104 by screws 646. Disposed in insulating block 645 are a plurality of contact prongs 647, their forward ends being slit at 648 to provide resiliency. The number of contact prongs 647 corresponds to the number of individual electrical conductors extending between the detachable magazine 51 and the recording and reproducing apparatus 50, an individual prong 647 being provided for each such conductor.

Secured to the under side of the floor 140 of magazine 51 is a cooperating block of insulating material 649 which has a plurality of circular holes 650 formed therein and extending therethrough. The centers of the holes 650 are in alignment with the longitudinal axes of the prongs 647. Disposed in each of the holes 650 and fixedly secured therein is a hollow cylindrical contact member 651 coaxial with one of the prongs 647. When the magazine 51 is locked in operating position on recording and reproducing device 50, each of the split prongs 647 engages the internal surface on one of the hollow cylindrical contact members 651. The prongs 647 thus serve to prevent upward movement of magazine 61 when it is locked in operating position. When magazine 51 is removed, the magazine 51 is slid forwardly to disengage prongs 647 from contact members 651, after which it may be raised and removed from the recording device 50.

A plurality of conductors 652 extend from each prong 647 to apparatus within the recording and reproducing device 50 and a corresponding plurality of conductors 653 extend from each cylindrical contact member 651 to apparatus within the magazine 51. When the magazine 51 is locked in operating position, the conductors 652 are connected to corresponding conductors 653 and these conductors disconnected from each other when magazine 51 is removed. In the embodiment of the invention illustrated, a total of four conductors are shown, and this number is sufficient, as hereinafter described. The actual number may be increased or decreased, as required.

Figures 10, 11:
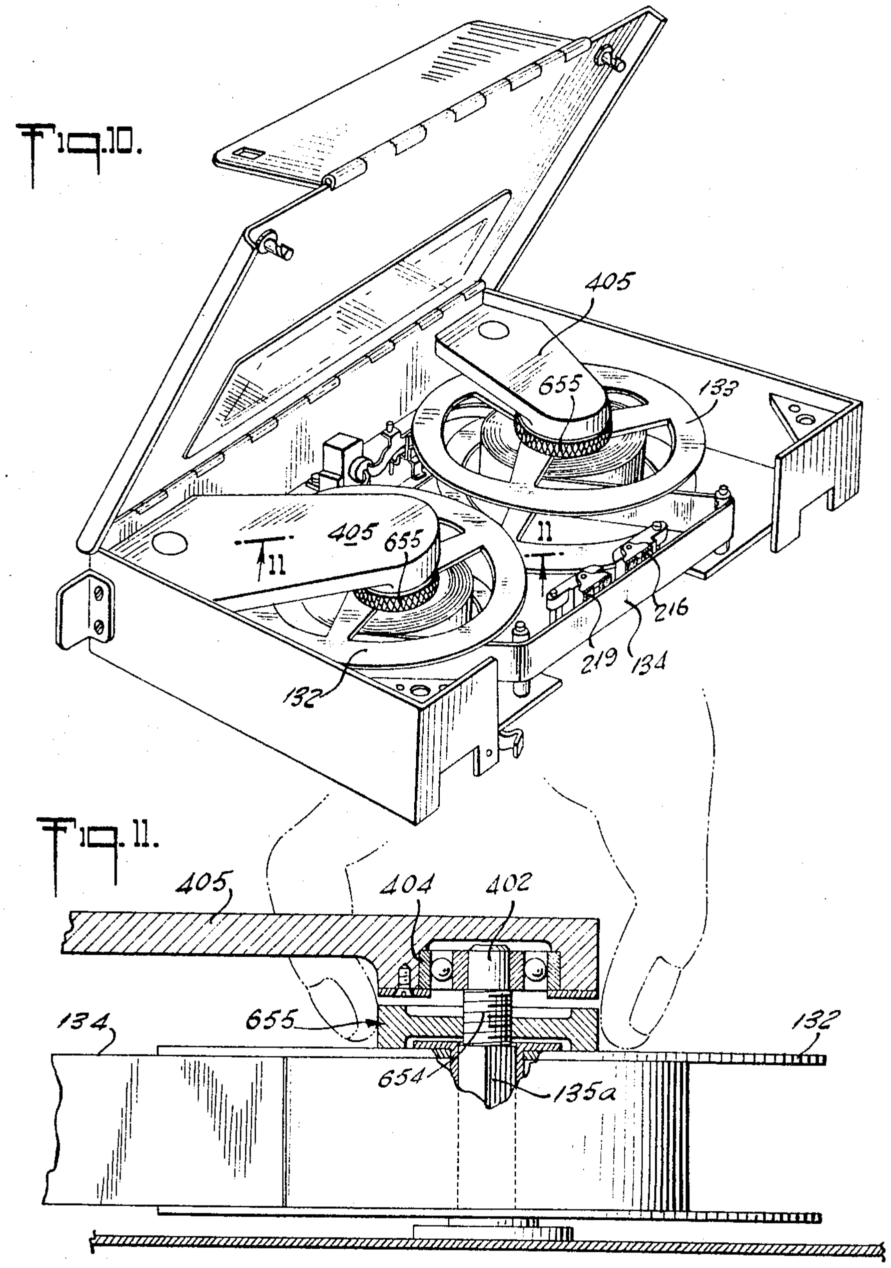
FIGURE 10 is a perspective view of the magazine with the cover in raised position showing threaded attaching means for securing the reels to their respective shafts.
FIGURE 11 is an enlarged sectional view in elevation taken along the line 11—11 of FIGURE 10 looking in the direction of the arrows.
Figure 12:
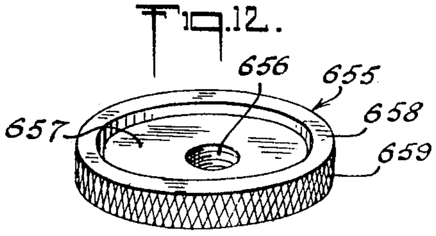
FIGURE 12 is an enlarged perspective view showing a circular knurled nut used for securing a reel to its shaft.

Referring to FIGS. 10 to 12, an arrangement is shown for securing the reels 132 and 133 to their respective drive shafts. This arrangement locks the reels in place upon their respective shafts, notwithstanding vibration and other conditions which tend to cause displacement of the reels axially upon their respective shafts. Additionally, this arrangement assures proper vertical positioning of the eight recording channels which are shown provided on the recording medium 134.

FIG. 11 shows the arrangement in the case of the reel 132, the other reel 133 being similarly secured. The drive shaft 135*a* is shown provided with an externally threaded portion 654 immediately below the tip portion 402 of circular cross-section which is journalled in ball bearings 404 carried by arm 405, the threaded portion 654 being disposed immediately above the portion of square cross section of drive shaft 135*a* upon which the reel 132 is mounted.

A circular knurled nut, designated generally as 655, is shown with a centrally located threaded aperture 656 formed therein, the aperture 656 being located in a central web portion 657 of reduced thickness. The web portion 658 is surrounded by a cylindrical flange portion 658, concentric with threaded aperture 656. The external periphery of flange portion 658 is provided with knurling 659 to facilitate tightening or loosening the nut 655 by hand. Both the upper and lower surfaces of flange portion 658 are symmetrical with respect to central web portion 657, and either surface of flange portion 658 may be positioned at the lower surface and may be placed in engagement with the upper surface of reel 132 by threading the central aperture 656 of nut 655 over the threaded portion 654 of reel shaft 135*a*. When tightened, nut 655 will hold reel 132 securely on shaft 135*a*.

Figure 13:
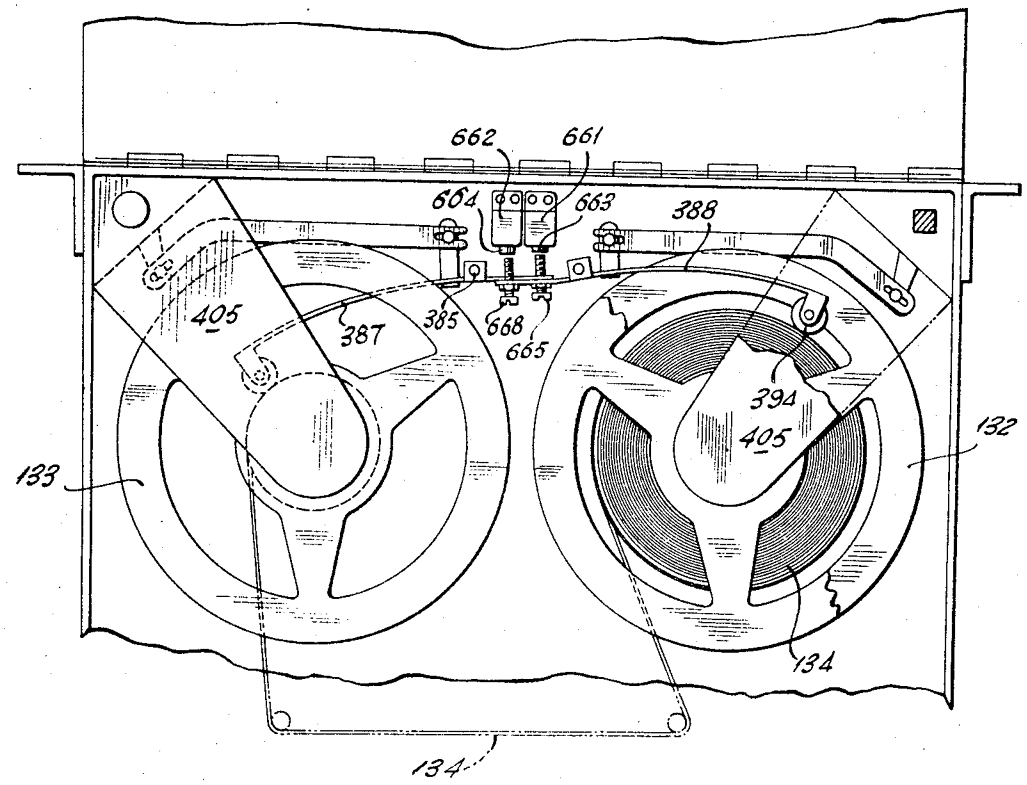
FIGURE 13 is a fragmentary plan view of a magazine showing independently adjustable control means for bringing the reel drive mechanism into its slow speed condition as either end of the recording medium is approached.
Figure 14:
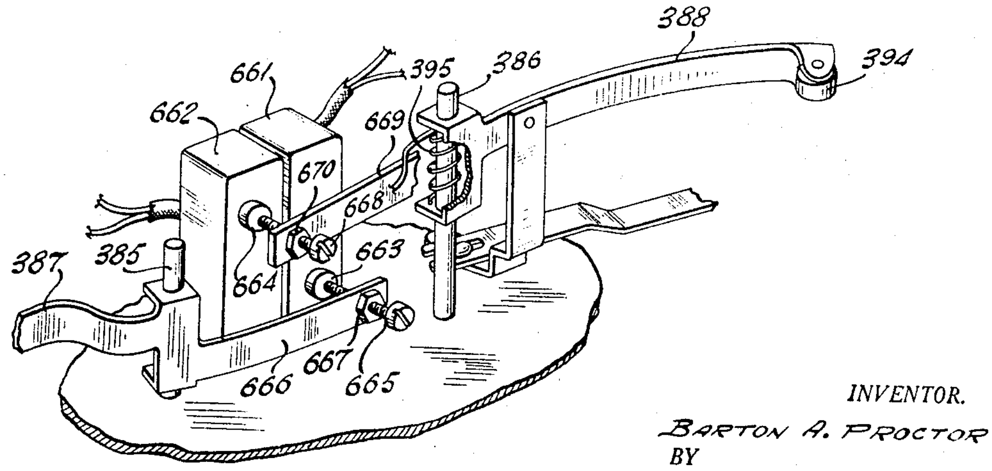
FIGURE 14 is an enlarged perspective view, partly broken away, showing the independently adjustable control means of FIG. 13.

Referring to FIGS. 13 and 14, an arrangement is illustrated for causing the reel drive mechanism to operate at low speed whenever a reversal of direction of travel of recording medium 134 is about to occur. When using the arrangement shown in FIGS. 3 and 4 and more fully described in my copending application Serial No. 338,777 filed February 25, 1953, no provision is made for the precise adjustment of the actuation of switch 401 by the speed control switch actuating arm 387 and 388.

For this purpose, the single switch 401 (FIGS. 3 and 4) is replaced by two independent switches 661 and 662 provided with actuating buttons 663 and 664 respectively. The switches 661 and 662 are of the normally closed type and their contacts are connected in series and in series with the electromagnet 92 (FIG. 18) of the high speed clutch mechanism (not shown). Thus, when either of the two switches 661 or 662 is actuated, electromagnet 92 will be deenergized and normal speed drive will be resumed, if high speed drive was previously being used.

The switch actuation should take place at a point very near to the point where reversal of direction of travel of recording medium 134 occurs in order to provide a maximum amount of travel at high speed when high speed travel is desired.

Accurate adjustment of the point of actuation of switch 661 is obtained by the provision of an adjusting screw 665 threaded into an extension of switch actuating arm 387, the arm 387 being pivotally mounted on the upright post 385. The position of adjusting screw 665 may be fixed by means of a locknut 667.

Switch actuating arm 388 is similarly provided with an adjusting screw 668 threaded into an extension 669 of the arm 388. The extension 668 of arm 388 is disposed above the extension 666 of arm 387 so that they are independently movable and do not interfere with each other. The position of adjusting screw 669 may be fixed by means of a locknut 670.

In operation, the tape engaging roller 394 is pressed into engagement with the recording medium 134 wound on reel 132 by a helical torsion spring 395 wound around upright post 386, the arm 388 being pivotally supported on the post 386. A tape engaging roller and spring are provided for switch actuating arm 387. When the supply of recording medium wound on reel 132 becomes depleted and direction of travel of the recording medium 134 is about to be reversed, the free end of adjusting screw 668 presses against switch actuating button 664 and actuates switch 662 opening the circuit of electromagnet 92. This causes the recording medium 134 to travel at normal speed, irrespective of whether or not it had been previously travelling at high speed. The point of actuation of switch 662 may be accurately fixed with respect to the amount of recording medium 134 wound on reel 132 by means of adjusting screw 668 and locknut 670. In this manner, the transfer to normal speed may be delayed until the last possible amount, thereby increasing the extent of travel at high speed, when high speed travel is desired.

The operation of switch 661 may be adjusted by means of screw 665 and locknut 667 like the operation of switch 662 described above.

Figure 16:
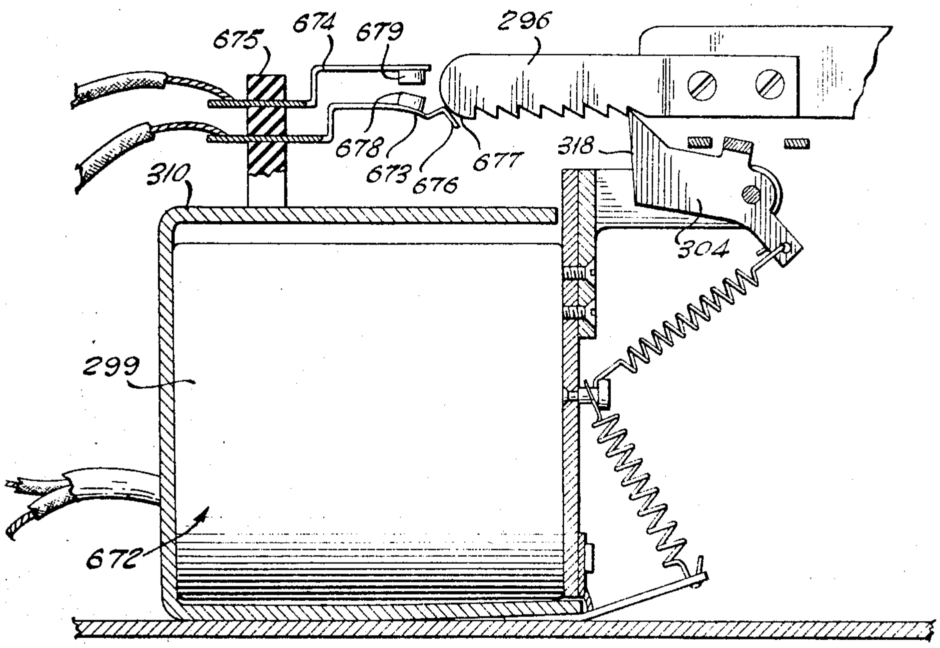
FIGURE 16 is an enlarged sectional view in elevation taken along the line 16—16 of FIG. 15 looking in the direction of the arrows.
Figure 17:
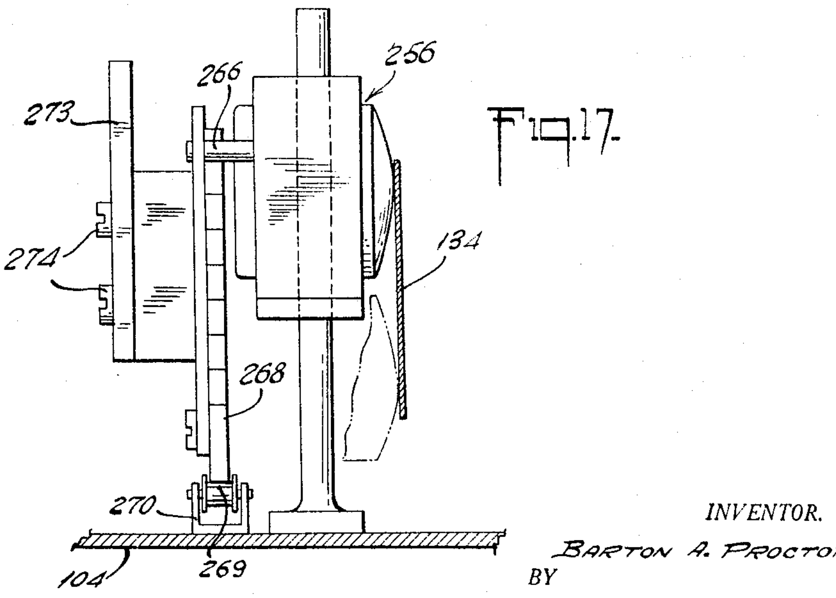
FIGURE 17 is an enlarged end view, partly in section, taken along the line 17—17 of FIG. 15, looking in the direction of the arrows.

Referring to FIGS. 15, 16 and 17, a limit switch is provided to stop the further driving of the reels 132 and 133 after the end of the eighth or lowermost recording channel has been reached.

The limit switch designated generally as 672 comprises a lower contact spring 673 and an upper contact spring 674. The contact springs 673 and 674 are mounted on the frame 310 of recording head carriage lowering electromagnet 299 by means of insulating blocks 675. The contact springs 673 and 674 are thus insulated from the frame 310 and from each other. The free end 676 of lower contact springs 673 is angularly bent for engagement with the rounded end 677 of rack member 296 at its limits of travel in a leftward direction as viewed in FIGS. 15 and 16.

Normally a contact button 378 carried by lower contact spring 673 is pressed into engagement with a contact button 679 carried by upper contact spring 674, completing an electrical circuit through contact springs 673 and 674. When the rounded end 677 of rack member 296 engages the bent end 676 of lower contact spring 673, spring 673 is forced downwardly and contact buttons 678 and 679 are separated from each other, thereby opening the electrical circuit through contact springs 673 and 674.

As more fully described in my said copending application, Serial No. 338,777 filed February 25, 1953, at the end of the first or uppermost recording channel on recording medium 134, a roller enters slot cut in the recording medium and causes closure of a pair of contacts 228–229 or 574–575 (FIG. 18) which energize the carriage lowering magnet 299. This causes armature 300 of the carriage lowering magnet to be attracted and the pointed end 318 of pawl 304 engages the first one of the ratchet teeth 298 of rack member 296. This draws carriage control bar 273 to the left and the two pins of which only pin 266 may be seen in the drawing, drop down one step on the step members 267 and 268, thereby lowering the recording head carriage 256 to bring the recording heads 216 and 219 into position for the next recording channel. At the same time, a friction drag is applied to one of the reels 132 and 133 and the other reel is driven so that the recording medium is wound on the reel which was previously unwinding and unwound from the reel on which it was previously wound. This change in drive from one reel to the other is accompanied by a reversal in the direction of travel of the recording medium, since the recording medium 134 is wound in the same direction on both reels.

Figure 18:
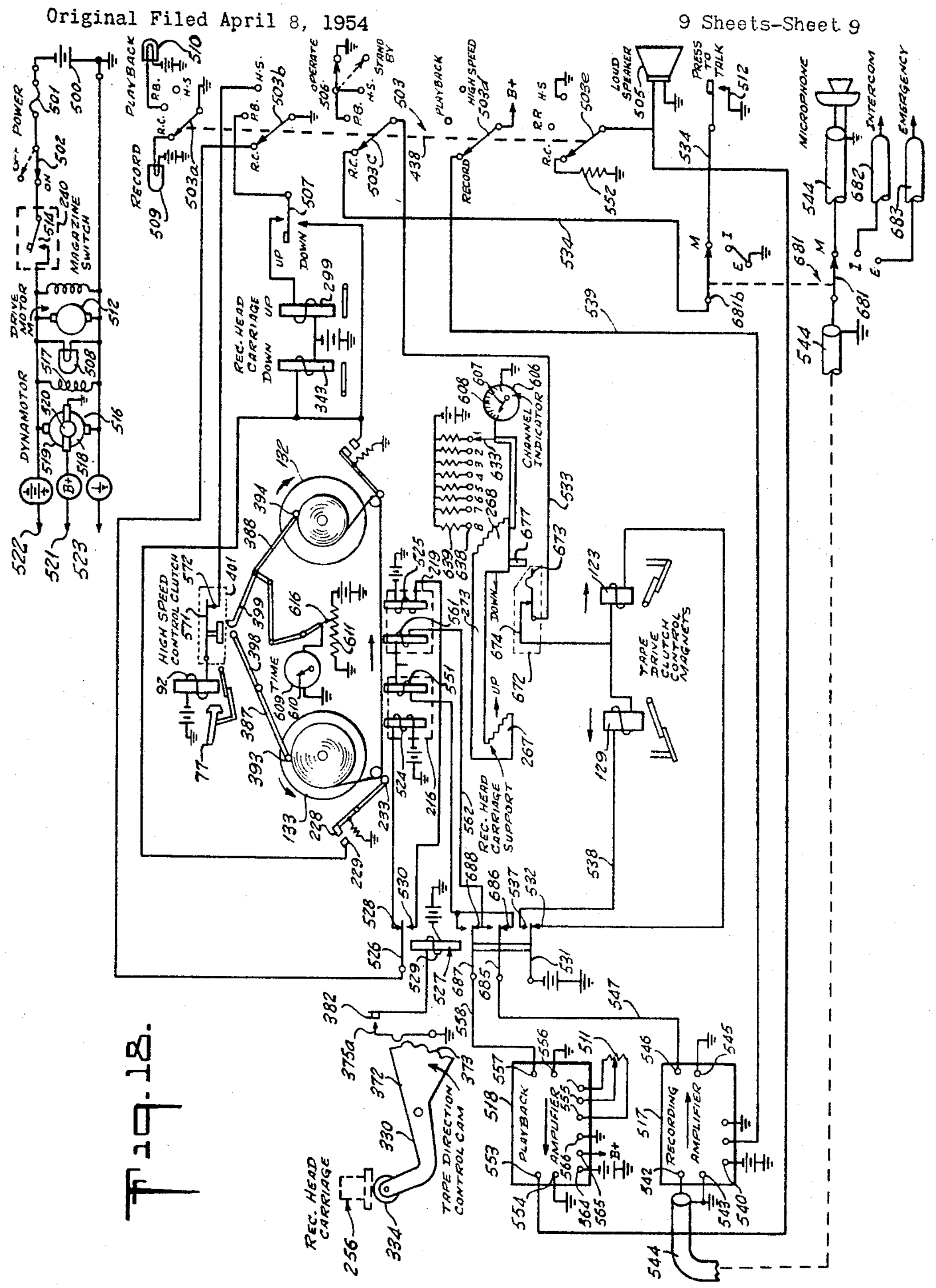
FIGURE 18 is a schematic electrical circuit diagram of the complete device.

At the end of the eighth recording channel, energization of carriage lowering magnet 299 brings the rounded end 677 of rack member 296 into engagement with the lower contact spring 673 of limit switch 672 thereby opening the circuit of the reel drive clutch control magnets 123 and 129 (FIG. 18). This stops further travel of the recording medium 134 until recording head carriage 256 is raised, the carriage lowering magnet 299 remaining energized until the direction of travel of recording medium 134 is reversed to bring the control roller out of the slot in recording medium. The direction of travel will reverse when the recording head carriage 256 is raised to the seventh or some other odd numbered recording channel.

Referring to FIG. 18, the operation of the recording and reproducing device is generally set forth below, insofar as the improvements of the present invention are concerned. In other respects, a more detailed description is given in my said copending application, Serial No. 338,777, filed February 25, 1953.

Power from a source indicated as a battery 500 is shown with the negative terminal connected to a main power fuse 501.

Power is derived from a source of direct current illustratively shown as a battery 500. The battery 500 has its negative terminal connected to a main power fuse 501, its positive terminal being grounded. Connection to battery 500 is established through cord 604 (FIG. 1) and plug 605.

From fuse 501 the negative side of the power supply passes through the main power switch 502 to the motor M, also shown in FIGURE 5. The motor M is provided with an armature 512 and a shunt field 513. Motor M operates continuously at substantially constant speed whenever switch 502 is closed and a magazine 51 is positioned for use upon the recording device 50, the magazine actuated switch 240 then having its actuating member 241 (FIG. 8) positioned to effect closure of its contacts 514. Removal of magazine 51 opens contacts 514 and stops operation of motor M, even though the main power switch 502 is in its "ON" position.

The main power pilot lamp 508 is lighted whenever motor M is in operation, and a plate supply dynamotor 516 is also in operation for furnishing anode voltage to the recording and playback amplifiers 517 and 518 respectively.

Dynamotor 516 comprises a shunt field 517 and an armature 518 provided with a low voltage commutator 519 and a high voltage commutator 520. The low voltage commutator is connected to drive armature 518 in multiple with motor M. The high voltage direct current output from commutator 520 has its negative terminal grounded and its high voltage positive terminal extends over a conductor 521 to all points on the drawing shown for simplicity of illustration as being connected to B+. Similarly, power from the negative terminal of source 500 and which is available only during the operation of motor M and dynamotor 516 is supplied via a conductor 522 to all points symbolically indicated as connected to an undesignated battery, connection to the positive terminal of source 500 via a conductor 523, being indicated by the symbol for ground, along with various other ground connections.

The control switch 503 is a five-pole three-position switch, as described above, the "RECORD," "PLAYBACK" and "HIGH SPEED" positions being designated "R," "PB" and "HS" at each pole.

In its "RECORD" position, the uppermost pole 503*a* of control switch 503 causes the recording pilot light 509 in lamp socket 446 to be lighted, the playback pilot light 510 being extinguished.

The second pole 503*b* of control switch 503, when the "RECORD" position supplies direct current to the erasing or obliterating windings 524 and 525, respectively, of recording heads 216 and 219, these erasing windings being used for obliterating previously recorded material before a new recording is impressed on the recording medium 134. Depending upon the direction of travel of magnetic tape 134, either winding 524 or 525 is selected for energization by the movable contact 526 of a tape direction relay designated generally at 527. The normally closed contact 528 engages movable contact 526 for energization of recording head erasing winding 524 when the magnetic tape 134 is traveling in the direction indicated by the arrow, the operating winding 530 of relay 527 then being deenergized. When tape 134 is traveling in the direction opposite to that indicated by the arrow, operating winding 529 of relay 527 is energized, and movable contact 526 engages the normally open contact 530 of relay 527 to energize the erasing winding 525 of recording head 219.

The third pole 503*c* of control switch 503 is arranged, with switch 503 in its "RECORD" position, to connect the press-to-talk switch 512 associated with microphone 504 for control of the tape driving clutch electromagnets 123 and 129. When tape directional relay 527 is deenergized and the magnetic tape 134 is moving in the direction of the arrow, reel 132 is winding the magnetic tape 134, and it is then being unwound from reel 133.

Clutch control magnet 123 controls the driving operation of reel 132 and one side of its operating winding is connected for energization from the negative terminal of source 500 through a movable contact 531 and a normally closed contact 532 of tape direction relay 527. The other side of the operating winding of reel driving clutch control magnet 123 is connected via a conductor 533 and through the normally closed contact springs 673 and 674 of limit switch 672, and thence through the pole 503*c* of control switch 503 and a further conductor 534 to the press-to-talk switch 512. Thus, whenever, press-to-talk switch 512 is operated to close its normally open contacts 535 and 536, clutch control magnet 123 is energized to drive reel 132 and wind magnetic tape 134 thereon, causing the tape 134 to travel from left to right as indicated by the arrow.

When tape direction relay 527 is energized, its movable contact 531 engages normally open contact 537 and disengages normally closed contact 532, thereby preventing energization of clutch magnet 123 and preparing clutch magnet 129 for energization over a conductor 538 and the conductors 533 and 534 described above. Thus, with tape direction relay 527 operated, press-to-talk switch 512 causes driving operation of reel 133 to wind the magnetic tape 134 thereon and unwind it from reel 132, whereby causing tape 134 to travel from right to left in the direction opposite to that indicated by the arrow.

The fourth pole 503*d* of control switch 503, with the control switch 503 in its "RECORD" position, connects the anode supply from the high voltage commutator 520 of dynamotor 516 over a conductor 539 for the energization of the anode circuits of the usual vacuum tubes (not shown) of recording amplifier 517. Terminal 540 of recording amplifier 517 is provided for the energization of cathode heating circuits within the amplifier from the negative terminal of source 509, as indicated, the cathode heating circuits being continuously energized at all times when the motor M and dynamotor 516 are in operation.

The input terminals 542 and 543 of recording amplifier 517 are connected via a flexible shielded conductor 544 to the microphone 504. Although omitted for simplicity of illustration, a suitable plug and jack may be included in this connection, if desired.

A two pole three position switch designated generally as 681 is included in the shielded line 544. The lower pole 681*a* is arranged to connect the input line 544 to a shielded line 682 which is connected to an intercommunicating system for an aircraft or a similar system when it is desired to record conversations over the system. The lower pole 681*a* is also arranged to connect the input line 544 to an emergency communication circuit through a shielded line 683 for the purpose of recording emergency instructions and other communications of an emergency nature which may be transmitted over the emergency system. The switch 681 may be manipulated by means of a knob 684 (FIG. 1) on the front of panel 602.

The upper pole 681*b* is arranged to disconnect conductor 534 from press-to-talk switch 512 and connect it directly to ground in order that one or the other of the reel driving clutch control magnets 123 and 129 be energized in order to record continuously any communications received from line 682 or from line 683 when switch 681 is positioned to connect the input terminals 542 and 543 of recording amplifier 517 to either of these lines.

The conductor 534 and a ground connection for press-to-talk switch 512 are also included in a suitable flexible cable along with the shielded conductor, so that the press-to-talk switch 512 may be located in convenient proximity to the microphone.

The output terminal 545 of recording amplifier 517 is shown grounded and the other output terminal 546 is shown connected via a conductor 547 to a movable contact 685 of tape direction relay 527. With tape direction relay 527 deenergized as shown, the output of recording amplifier 517 is connected through normally closed contact 686 to the recording and reproducing winding 551 of recording head 216. Winding 551 is arranged to impress a recording magnetically on the tape 134 when it is traveling from left to right in the direction indicated by the arrow.

The fifth pole 503*e* of control switch 503, when in its "RECORD" position, connects a shunting resistor 552 across the loudspeaker 505 for reducing the acoustic level of the reproduced sounds while recording, thereby eliminating or reducing undesirable effects by acoustic feedback from loudspeaker 505 to microphone 504, yet at the same time permitting monitoring of the recorded signals as hereinafter described.

One of the output terminals 553 of playback amplifier 518 is shown connected to loudspeaker 505, the other terminal 554 being grounded for completion of the loudspeaker circuit. A playback volume control 511 mounted on control panel 602 (FIG. 1) is connected to terminals 555 which extend to appropriate points within the playback amplifier 518 in known manner.

The input terminal 555 of playback amplifier 518 is shown grounded and the other input terminal 557 is connected via a conductor 558 to a movable contact 687 of tape direction relay 527. With tape direction relay 527 released, as shown, the input of playback amplifier 518 is connected to the recording and reproducing winding 561 of recording head 219 via a conductor 562 and a normally closed contact 688 of tape direction relay 527. In this manner, the loudspeaker reproduces the recorded sounds for monitoring purposes, immediately after they have been recorded on the magnetic tape 134, the volume of the reproduced sounds under recording conditions being reduced, as described above, by the shunt resistor 552.

Power supply terminals 564 and 565 are provided for the energization of the cathode heater and anode circuits, respectively, the power supply terminal 566, which is shown grounded, being common to both the cathode heater and anode energization circuits. It should be noted that the playback amplifier 518 is fully operative at all times when the motor M and dynamotor 516 are running.

The first pole, 503*a*, of control switch 503, when moved to its "PLAYBACK" position, causes the recording pilot light 509 to be extinguished and the playback pilot light 510 to be lighted.

The second pole 503*b* of control switch 503, when in its "PLAYBACK" position, establishes a circuit from ground via a conductor 567 to the three-position nonlocking recording head carriage control switch 507, preparing this switch for operation. When the second pole 503*b* of control switch 503 is moved to its "PLAYBACK" position, the circuit from ground to movable contact 526 of tape direction relay 527 is opened, thereby preventing energization of either of the erasing windings 524 or 525 of recording heads 216 and 219. This prevents undesired obliteration of any of the signals recorded on magnetic tape 134 during playback operation of the machine.

The recording head carriage control switch 507 is then arranged to energize recording head carriage elevating magnet 343 over conductor 568 when switch handle 444 (FIG. 1) is moved upwardly to its "ELEVATE" position. Each time switch handle 444 is so moved, the recording head carriage 256 steps upwardly with respect to magnetic tape 134 by one line to the next lower numbered recording area. Each time switch handle 444 moves downwardly to its "DOWN" position, electromagnet 299 is energized via a conductor 569 to drop the recording head carriage to the next higher numbered recording area. In this manner, the recording head carriage 256 may be moved upwardly or downwardly at will by one line at a time to facilitate the rapid location of a specific desired portion to magnetic tape 134 where particular signals have been recorded which it is desired to reproduce.

The third pole 503*c*, of control switch 503, when in its "PLAYBACK" position, connects the reel drive clutch control magnets 123 and 129 for control by the tape control switch 506. When switch 506 is in its "OPERATE" position, one or the other of tape drive clutch control magnets 123 and 129 will be steadily energized as determined by the operated or non-operated condition of tape direction relay 527 so that the magnetic tape 134 will be in continuous travel in either one direction or the other.

When tape control switch 506 is in its "STANDBY" position, neither of the tape drive clutch magnets 123 or 129 can be energized, and the magnetic tape 134 remains stationary.

If desired, the third pole 503*c* of control switch 503 may be omitted, and the conductor 533 and 534 may then be connected directly to terminal 570 of tape control switch 506. Using this arrangement, the tape may be driven continuously by operating handle 442 of tape control switch 506 upwardly to its "RUN" position.

The fourth pole 503*d* of control switch 503, when in the "PLAYBACK" position, cuts off the anode supply over conductor 539 to the recording amplifier 517. This renders the recording amplifier inoperative and prevents the impressing of a new recording on a previously recorded signal.

The fifth pole 503*e* of control switch 503, when in its "PLAYBACK" position, removes the shunting resistor 552 from the circuit of loudspeaker 505 so that the signals being played back are reproduced at full volume. Since recording amplifier 517 is inoperative under playback conditions, sound picked up by microphone 504 have no effect on the operation of the machine.

The first pole 503*a* of control switch 503, when in its "HIGH SPEED" position, extinguishes both the recording and playback pilot light 609 and 610 respectively.

The second pole 503*b* of control switch 503, when in its "HIGH SPEED" position, energizes speed selecting clutch control magnet 92 which raises clutch arm 77 to cause high speed operation of magnetic tape 134 for rapidly bringing some desired portion thereof into operative position with respect to the recording heads 216 and 219. Specific mechanism for this purpose is described in greater detail in my said copending application Serial No. 338,777. Insofar as the present invention is concerned, any type of magnetically controlled two-speed drive may be used. With tape control switch 506 in its "OPERATE" position, the magnetic tape 134 will be driven at high speed in a direction determined by which one of the two tape drive clutch control magnets, 123 or 129 is energized. As the end of the tape is approached, the normally closed contacts 571–572 of switch 401 (FIGS. 3 and 4) are opened by one of the two switch actuating arms 387 and 388. Either switch actuating arm, as its roller 393 and 394 nears the center of reel 133 or 132, respectively, will cause its end portion 398 or 399 to bear against the actuating button 400 of switch 401, thereby opening its closed contacts 571–572. This deenergizes speed selecting clutch control magnet 92 causing the magnetic tape 134 to be driven at normal speed as the end of the tape is approached and its direction of travel is about to be reversed.

The third pole 503*c* of control switch 503, when in its "HIGH SPEED" position, connects the reel drive clutch control magnets 123 and 129 for control by tape control switch 506.

The fourth pole 503*d* of control switch 503, when in its "HIGH SPEED" position, maintains the anode supply disconnected from recording amplifier 517 so that the recording amplifier 517 remains inoperative.

The fifth pole 503*e* of control switch 503, when in its "HIGH SPEED" position, places a direct short circuit across loudspeaker 505 so that it is muted during high speed operation of the machine.

The tape direction relay 527 is controlled by a control cam 372 whose position is determined by the vertical position of recording head carriage 256. Cam 372 is provided with an arm 330 which carries a roller 334 at its free end. Roller 334 is spring pressed upwardly into engagement with a lower surface of recording head carriage 256. When recording head carriage 256 moves downwardly, the cam 372 moves upwardly. Cam 372 is provided with an undulatory cam surface 373 which alternately opens and closes contacts 375*a* and 382 a recording head carriage 265 moves downwardly from one recording channel to the next. This action alternately operates and releases tape direction relay 527.

As shown in FIG. 18, for the first, or uppermost of the eight vertically spaced recording channels, the contacts 375*a* and 382 are open.

For line 2, these contacts are closed, operating tape direction relay 527, thereby reversing the direction of travel of magnetic tape 134 from the left to right direction indicated in FIGURE 50 to the right to left direction opposite to that indicated by the arrow. The circuit changes caused by operation and release of tape direction relay 527 have been described above. Alternate opening and closure of contacts 375*a*–382 accompanies successive vertical movements of recording head carriage 256 from one line to the next in either direction. Thus, for the odd numbered lines, 1, 3, 5 and 7, contacts 375*a*–382 are open and tape direction relay 527 is released as shown in FIGURE 50. For the even numbered lines 2, 4, 6 and 8, contacts 375*a*–382 are closed, operating tape direction relay 527.

As the magnetic tape 134, travelling in the direction of the arrow shown in FIG. 18, reaches the end of the first recording channel, the roller 233 enters a control slot (not shown) in the tape 134 and causes closure of contacts 228 and 229. Closure of contacts 228 and 229 energizes recording head carriage lowering magnet 299, dropping the recording head carriage 256 to the next lower line. This causes closure of contacts 375*a* and 382 controlled by cam member 372 and tape direction relay 527 operates.

Operation of tape direction relay 527 releases clutch magnet 123 which causes reel 132 to be driven and energizes clutch control magnet 129 which causes reel 133 to be driven instead of reel 132.

Operation of tape direction relay 527 also interchanges the output connections of recording amplifier 517 and the input connections of playback amplifier 518 so that recording and reproducing winding 561 of recording head 219 is used for recording and recording and reproducing winding 551 of recording head 216 is used for playback. Erasing magnet 524 is deenergized and erasing magnet 525 is energized instead so that erasing immediately precedes recording with the tape 134 moving in the direction opposite to the arrow.

As the magnetic tape 134 winds and unwinds from reel 132, the movable contact 611 moves along resistor 611 and delivers a voltage to time indicator 609 in accordance with the amount of tape on reel 132. Indicator 609 is calibrated in minutes based on the normal speed of travel of magnetic tape 134.

As the recording head carriage drops from line to line, movable contact 633 moves progressively from one of the contacts 638 to the next. At each position, a different one of the resistors 639 is included in circuit of channel indicator 606. The resistance values of the various resistors 639 are so selected that the reading of channel indicator 606 will correspond to the particular recording channel with which the recording heads 216 and 219 are actually engaged.

While I have shown that I believe to be the best embodiments of my invention, I do not wish, however, to be confined to the embodiments shown, but what I desire to cover by Letters Patent is set forth in the appended claims.

What is claimed is:

1. An apparatus of the class described, comprising: first casing containing a pair of reel members; a recording medium in strip form disposed on said reel members to be selectively wound on one of said reel members and unwound from the other reel member, said recording medium comprising a portion extending intermediate said reel members; selectively operable driving means for driving one of said reel members for winding said recording medium thereon; transducing means movable transversely with respect to said intermediate portion of said recording medium for operative relationship with respect to any one of a plurality of spaced parallel longitudinally extending recording areas thereon; and remote indicating means for indicating the transverse position of said transducing means, said indicating means comprising: a switch member which moves in accordance with the transverse position of said transducing means; a plurality of resistors; circuit means connecting said resistors to said switch member to obtain a different resistance in each position of said transducing means; a second casing remote from the first casing and containing an indicator; and an energizing circuit extending between said casings and connecting said indicator to said resistors through said switch means, said second casing including means for controlling the apparatus in said first casing.

2. An apparatus according to claim 1 in which each of said resistors is at a different resistance, said switch means connecting one of said resistors individually in said energizing circuit.

3. An apparatus of the class described, comprising: a casing containing a pair of reel members; a recording medium in strip form disposed on said reel members to be selectively wound on one of said reel members and unwound from the other reel member, said recording medium comprising a portion extending intermediate said reel members; selectively operable driving means for driving one of said reel members for winding said recording medium thereon; transducing means movable transversely with respect to said intermediate portion of said recording medium for operative relationship with respect to any one of a plurality of spaced parallel longitudinally extending recording areas thereon; a movable carriage for supporting said transducing means; a step member having a plurality of steps formed therein, each step being engageable with said carriage for limiting movement thereof; means for producing relative movement between said step member and said carriage for causing transverse movement of said transducing means; and indicating means for indicating the position of said carriage at a point remote from said casing, said indicating means comprising a switch member which moves in accordance with the position of said carriage, a plurality of resistors, circuit means connecting said resistors to said switch member to obtain a different resistance in each position of said carriage, a second casing, an indicator, and an energizing circuit extending between said casings and connecting said indicator to said resistors through said switch means.

4. An apparatus of the class described, comprising: a first casing containing a pair of reel members; a recording medium in strip form disposed on said reel members to be selectively wound on one of said reel members and unwound from the other reel member, a movable member engaging the outer surface of the recording medium wound on one of said reel members; and remote indicating means responsive to the position of said movable member, said indicating means comprising: a switch member which moves in accordance with the transverse position of said transducing means; a plurality of resistors; circuit means connecting said resistors to said switch member to obtain a different resistance in each position of said transducing means; a second casing remote from the first casing and containing an indicator; and an energizing circuit extending between said casings and connecting said indicator to said resistors through said switch means, said second casing including means for controlling the apparatus in said first casing.

5. An apparatus of the class described, comprising: a first casing including a pair of reel members; a recording medium in strip form disposed on said reel members to be selectively wound on one of said reel members and unwound from the other reel member, said recording medium comprising a portion extending intermediate said reel members; selectively operable driving means for driving one of said reel members for winding said recording medium thereon; transducing means movable transversely with respect to said intermediate portion of said recording medium for operative relationship with respect to any one of a plurality of spaced parallel longitudinally extending recording areas thereon; means responsive to the transverse position of said transducing means for selecting one of said reel members to be driven by said driving means; and a second casing remote from the first casing including a first remote indicating means responsive to the transverse position of said transducing means, comprising means for indicating which of said two calibrated scales is indicative of the time remaining to complete the unwinding of said recording medium from one of said reel members in accordance with which one of said reel members is being driven by said driving means, and a second remote indicating means responsive to the amount of said recording medium wound on one of said reel members, said second remote indicating means comprising an indicator having two oppositely directed scales calibrated in units of time based on the normal speed of travel of said recording medium.

6. An apparatus according to claim 5, in which said first remote indicating means comprises an indicator having a scale with a plurality of contiguously arranged areas, alternate areas being distinctively colored with one of two colors; and wherein said two calibrated scales of said indicator of said second remote indicating means are each identified by a different one of said two distinctive colors.

References Cited by the Examiner

UNITED STATES PATENTS

| | | | |
|---|---|---|---|
| 2,191,691 | 2/1940 | Woolf | 274—11 |
| 2,430,538 | 11/1947 | Somers | 274—4 |
| 2,513,423 | 7/1950 | Owens | 274—4 |
| 2,668,059 | 2/1954 | Roberts | 274—11 X |
| 2,803,413 | 8/1957 | Lyon | 242—68.3 |
| 2,862,677 | 12/1958 | Selster | 242—68.3 |
| 2,911,161 | 11/1959 | Proctor | 179—100.2 |
| 2,933,319 | 4/1960 | Proctor | 274—4 X |

NORTON ANSHER, *Primary Examiner.*

BERNARD KONICK, JOHN M. HORAN, *Examiners.*

J. R. GOUDEAU, CLIFFORD B. PRICE, *Assistant Examiners.*